US012577385B2

(12) United States Patent
Wang et al.

(10) Patent No.: US 12,577,385 B2

(45) Date of Patent: Mar. 17, 2026

(54) POLYPROPYLENE COATING COMPOSITION

(71) Applicant: Borealis AG, Vienna (AT)

(72) Inventors: Jingbo Wang, Linz (AT); Markus Gahleitner, Linz (AT); Klaus Bemreitner, Linz (AT); Pauli Leskinen, Porvoo (FI); Peter Neidersuess, Linz (AT); Auli Nummila-Pakarinen, Kullo (FI)

(73) Assignee: BOREALIS GMBH, Vienna (AT)

( * ) Notice: Subject to any disclaimer, the term of this patent is extended or adjusted under 35 U.S.C. 154(b) by 673 days.

(21) Appl. No.: 17/923,335

(22) PCT Filed: May 26, 2021

(86) PCT No.: PCT/EP2021/064079

§ 371 (c)(1),
(2) Date: Nov. 4, 2022

(87) PCT Pub. No.: WO2021/239827

PCT Pub. Date: Dec. 2, 2021

(65) Prior Publication Data

US 2023/0242750 A1 Aug. 3, 2023

(30) Foreign Application Priority Data

May 27, 2020 (EP) .................................... 20176795

(51) Int. Cl.

| | |
|---|---|
| ***C08L 23/16*** | (2006.01) |
| ***B29C 48/154*** | (2019.01) |
| ***B29K 23/00*** | (2006.01) |
| ***C09D 123/16*** | (2006.01) |

(52) U.S. Cl.

CPC ............ *C08L 23/16* (2013.01); *B29C 48/154* (2019.02); *C09D 123/16* (2013.01); *B29K 2023/16* (2013.01); *C08L 2314/06* (2013.01)

(58) Field of Classification Search

None

See application file for complete search history.

(56) References Cited

U.S. PATENT DOCUMENTS

| | | | | |
|---|---|---|---|---|
| 4,876,321 | A * | 10/1989 | Lo | C08F 10/00 526/901 |
| 2002/0106194 | A1* | 8/2002 | Ando | H04N 9/7921 386/241 |
| 2016/0060371 | A1* | 3/2016 | Boragno | C08F 4/6592 526/65 |
| 2016/0280899 | A1* | 9/2016 | Töltsch | C08L 23/142 |
| 2018/0340058 | A1 | 11/2018 | Standaert et al. | |

FOREIGN PATENT DOCUMENTS

| | | | |
|---|---|---|---|
| EP | 2978872 | A1 | 2/2016 |
| EP | 3033387 | A1 | 6/2016 |
| JP | 2000063419 | A | 2/2000 |
| JP | 2000351879 | A | 12/2000 |
| JP | 2002363356 | A | 12/2002 |
| JP | 2008144086 | A | 6/2008 |
| JP | 2008540815 | A | 11/2008 |
| JP | 2009512750 | A | 3/2009 |
| JP | 2009542872 | A | 12/2009 |
| JP | 2010106172 | A | 5/2010 |
| JP | 2012233195 | A | 11/2012 |
| JP | 2016525597 | A | 8/2016 |
| JP | 2019536856 | A | 12/2019 |
| WO | 1999009079 | A1 | 2/1999 |
| WO | 2009103750 | A2 | 8/2009 |
| WO | 2011141070 | A1 | 11/2011 |
| WO | 2012093099 | A1 | 7/2012 |
| WO | 2016116606 | A1 | 7/2016 |

* cited by examiner

*Primary Examiner* — Christopher M Rodd

(74) *Attorney, Agent, or Firm* — Lippes Mathias LLP

(57) ABSTRACT

The present invention relates to a polypropylene composition comprising a propylene random copolymer having—a melt flow rate MFR2 (230° C./2.16 kg) measured according to ISO 1133 of 15 to 40 g/10 min, —a melting temperature Tm as determined by DSC according to ISO 11357 of 115 to 145° C., and—a number of 2,1 and 3,1 regio defects of from 0.01 to 1.2 mol % as measured by 13C NMR, to an article coated with said composition, to a process for coating an article with said composition and to the use of said composition for coating an article.

19 Claims, 2 Drawing Sheets

POLYPROPYLENE COATING COMPOSITION

CROSS REFERENCE TO RELATED APPLICATIONS

Figure 1:
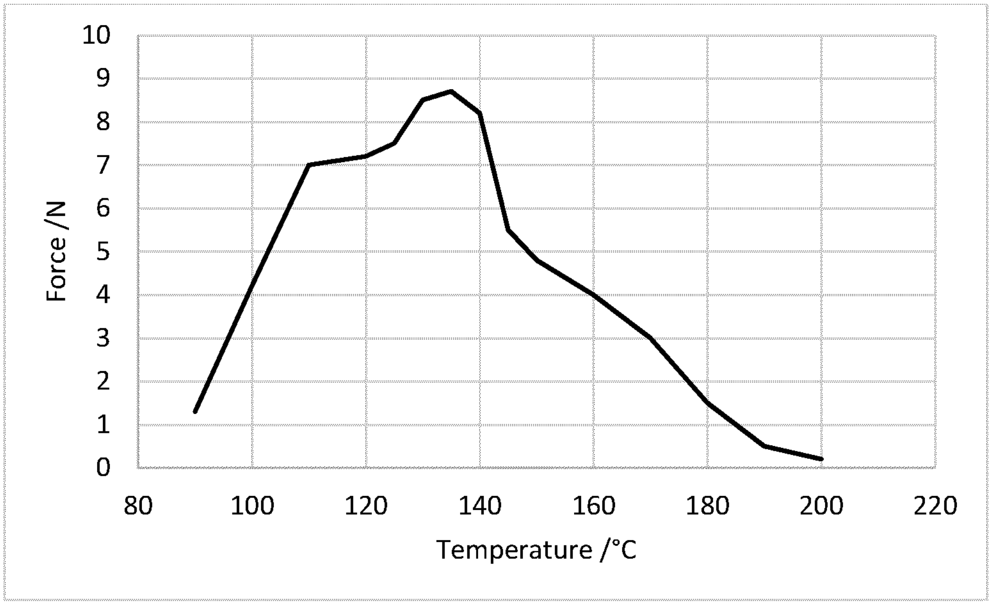

This is a 371 of PCT Application No. PCT/EP2021/064079, filed May 26, 2021, which claims the benefit of European Application No. 20176795.1, filed May 27, 2020, the contents of which are incorporated herein in their entirety.

The present invention relates to a propylene random copolymer suitable for extrusion coating, to a coated article having a layer comprising said propylene random copolymer, to a process for coating of an article in which said propylene random copolymer is used and to the use of said propylene random copolymer for coating of an article.

In general, extrusion coating of substrates such as paper, paperboard, fabrics and metal foils with a thin layer of plastic is practiced on a large scale. The coating composition is extruded in a first step whereby the flux of molten polymeric material passes through a flat die to obtain a film having a thickness of a few microns. In the second step, i.e. the coating step, the film is laid on a support and passed on a cooling cylinder. Upon cooling, the polymer adheres to its support. High speed extrusion coating asks for relative high melt flow rates $MFR_2$ of 10 g/10 min or higher. A description of the extrusion coating process is given, for instance, in Crystalline Olefin Polymers, Part II, by R. A. V. Raff and K. W. Doak (Interscience Publishers, 1964), pages 478 to 484, or in Vieweg, Schley and Schwarz: Kunststoff Handbuch, Band IV, Polyolefine, Carl Hanser Verlag (1969), 20, pages 412 to 420.

U.S. Pat. No. 3,418,396 discloses polypropylene/polyethylene compositions for extrusion coating having high melt flow rates. The polypropylene used is disclosed to have a high degree of hexane extractables, which is undesirable especially for coating of articles for food applications. Furthermore, the presence of polyethylene decreases the ability of the compositions to withstand high temperatures. However, as in the field of some food applications such as retort pouches or some medical applications, a sterilization treatment is needed which requires a sufficient thermal stability of the extruded coating.

EP 2 999 721 discloses propylene random copolymers having high melt flow rates which are produced in the presence of a Ziegler-Natta catalyst. Also these propylene random copolymers have a comparatively high degree of hexane extractables. Furthermore, EP 2 999 721 is not specifically related to extrusion coating and hence the sealing properties of the copolymers, e.g. in terms of hot tack force and hot tack temperature, need still to be improved.

Propylene random copolymers can also be produced using single-site catalysts such as metallocene catalysts. However, the high melt flow rates required for extrusion coating are usually obtained through controlled rheology, i.e. by a treatment of the polypropylene after its production which increases the melt flow rate, such as by the use of peroxide or radiation.

WO 2012/109449 discloses controlled rheology formulations containing high melt strength polypropylene for extrusion coating, based on a radiation modification process.

However, these modifications lead to a significant degradation of the polypropylene which is responsible e.g. for the formation of gels so that the use of polypropylene compositions in high demand applications such as in the medical area is limited.

Accordingly, there is still the need for improved propylene polymer compositions being suitable for extrusion coating for a broad variety of substrates with improved sealing and hot tack properties, which have low gel content and are capable of withstanding high temperatures. To achieve these properties, the composition should not need the addition of processing aids such as LDPE or to use of rheology controlled materials.

The present invention provides a polypropylene composition comprising, or consisting of, a propylene random copolymer having a melt flow rate $MFR_2$ (230° C./2.16 kg) measured according to ISO 1133 of 15 to 40 g/10 min, a melting temperature $T_m$ as determined by DSC according to ISO 11357 of 115 to 145° C., and a number of 2,1 and 3,1 regio defects of from 0.01 to 1.2 mol % as measured by $^{13}C$ NMR.

The polypropylene composition of the invention is well suited for high speed extrusion coating, shows improved sealing properties and yields coatings which have, i.a., low hexane extractables so that the coated articles may be used for food packaging.

The regio-defects of propylene polymers can be of three different types, namely 2,1-erythro (2,Ie), 2,1-threo (2,It) and 3,1 defects. A detailed description of the structure and mechanism of formation of regio defects in polypropylene can be found in Chemical Reviews 2000,100(4), pages 1316-1327. These defects are measured using $^{13}C$ NMR as described in more detail below.

The term "2,1 regio defects" as used in the present invention defines the sum of 2,1-erythro regio-defects and 2,1-threo regio defects.

Propylene random copolymers having a number of regio defects as required in the propylene composition of the invention are usually and preferably prepared in the presence of a single-site catalyst.

The catalyst influences in particular the microstructure of the polymer. Accordingly, polypropylenes prepared by using a metallocene catalyst provide a different microstructure compared to those prepared by using Ziegler-Natta (ZN) catalysts. The most significant difference is the presence of regio-defects in metallocene-made polypropylenes which is not the case for polypropylenes made by Ziegler-Natta (ZN) catalysts.

Preferably, the number of 2,1 and 3,1 regio defects in the propylene random copolymer is from 0.1 to 1.0 mol %, and more preferably from 0.2 to 0.9 mol % as measured by $^{13}C$ NMR.

It is preferred that the composition of the invention comprises at least 80 wt. % of the propylene random copolymer, more preferably at least 90 wt. % of the propylene random copolymer and most preferably the propylene random copolymer is the only polymeric component present in the composition, i.e. the polypropylene composition consists of the propylene random copolymer and, optionally, contains one or more additives such as described herein below. The amount of additives, if present, is usually 5 wt. % or less, preferably 3 wt. % or less.

The propylene random copolymer as contained in the inventive composition has preferably a melt flow rate $MFR_2$ (230° C./2.16 kg) measured according to ISO 1133 of 17 to 35 g/10 min, still more preferably of 20 to 30 g/10 min.

The melting temperature $T_m$ as determined by DSC according to ISO 11357 of the propylene random copolymer is preferably 120 to 140° C., still more preferably is 122 to 135° C.

Furthermore, the propylene random copolymer preferably has a comparatively small molecular weight distribution as determined by GPC. Accordingly, the propylene random copolymer preferably has a molecular weight distribution MWD of 2.4 to 5.5, more preferably of 2.5 to 4.5, and still more preferably of 2.7 to 4.0.

Still further, the propylene random copolymer has the advantage of having only a low amount of hexane extractable. Thus, it is preferred that the propylene random copolymer has a hexane extractables content as measured according to the FDA test of less than 2.0 wt. %, more preferably of less than 1.5 wt. %.

Preferably, the propylene random copolymer is an ethylene propylene random copolymer, i.e. preferably it consists of propylene and ethylene monomer units.

Further preferred in this embodiment, it has an ethylene content in the range of 2.0 to 5.5 wt. %, more preferably in the range of from 2.1 to 5.0 wt. %, still more preferably in the range of from 2.2 to 4.5 wt. %, and most preferably in the range of from 2.5 to 4.0 wt. %.

In order to facilitate processing it is also desirable that the random propylene copolymer has a suitable crystallization temperature even in absence of any nucleating agents.

Thus, preferably, the propylene random copolymer has a crystallization temperature $T_c$ as determined by DSC according to ISO 11357 in the range of 75 to 110° C., more preferably in the range of 80° C. to 105° C., like in the range of 82° C. to 100° C.

The propylene random copolymer preferably has a xylene cold soluble (XCS) fraction as determined according to ISO 16152 of from 0.1 to below 15 wt. %, more preferably of from 0.2 to 10 wt. %, and most preferably of 0.5 to 7.5 wt. %.

Furthermore, the propylene random copolymer preferably has a flexural modulus as determined according to ISO 178 on injection moulded specimens of 500 to 1000 MPa, more preferably in the range of 550 to 950 MPa, and most preferably in the range of 600 to 900 MPa.

Preferably, the random propylene copolymer comprises, or consists of, two polymer fractions (RACO-1) and (RACO-2). The split between fractions (RACO-1) and (RACO-2) is preferably from 30:70 to 70:30, more preferably is from 45:55 to 65:35, and most preferably is from 55:45 to 60:40.

Optionally, a small fraction of prepolymer, usually below 5 wt. %, may also be present in the random propylene copolymer.

In the embodiment where random propylene copolymer is an ethylene propylene copolymer, preferably (RACO-1) has an ethylene content in the range of 1.5 to 5.5 wt. %, more preferably of 2.0 to 5.0 wt. % and most preferably of 2.5 to 4.0 wt. %, and/or preferably (RACO-2) has an ethylene content in the range of 2.0 to 6.0 wt. %, more preferably of 2.5 to 5.5 wt. % and most preferably of 3.0 to 5.0 wt. %.

The ethylene content of fraction (RACO-1) is preferably lower than the ethylene content of fraction (RACO-2).

Furthermore, it is preferred that (RACO-1) has a melt flow rate $MFR_2$ (230° C./2.16 kg) measured according to ISO 1133 in the range of from 3.0 to 20.0 g/10 min, more preferably 5.0 to 17.0 g/10 min and most preferably 7.0 to 15.0 g/10 min, and/or that (RACO-2) has a melt flow rate $MFR_2$ (230° C./2.16 kg) measured according to ISO 1133 in the range of from 5.0 to 50.0 g/10 min, more preferably 10 to 40 g/10 min and most preferably 15 to 30 g/10 min.

Preferably, the random propylene copolymer is produced in the presence of a metallocene catalyst, which is preferably a metallocene catalyst comprising a complex in any one of the embodiments as described in WO2013/007650, WO2015/158790 and WO2018/122134.

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

Suitable co-catalysts are described in WO2013/007650, WO2015/158790 and WO2018/122134 and it is preferred that a cocatalyst in any one of the embodiments as described therein is used.

The catalyst system used to manufacture the random propylene copolymers of the invention is ideally provided in solid particulate form supported on an external carrier.

The particulate support material used is silica or a mixed oxide such as silica-alumina. The use of a silica support is preferred.

Especially preferably the support is a porous material so that the complex may be loaded into the pores of the particulate support, e.g. using a process analogous to those described in WO94/14856, WO95/12622 and WO2006/097497.

The preparation of the solid catalyst system is also described in WO2013/007650, WO2015/158790 and WO2018/122134 and it is preferred that the catalyst system is prepared according to any one of the embodiments described therein.

The random propylene copolymer in any of its embodiments comprising two fractions (RACO-1) and (RACO-2) is preferably produced in a process comprising the following steps:

a) polymerizing in a first reactor (R1) propylene and comonomer, preferably ethylene, obtaining polymer fraction (RACO-1),
b) transferring said polymer fraction (RACO-1) and unreacted comonomers of the first reactor in a second reactor (R2),
c) feeding to said second reactor (R2) propylene and comonomer, preferably ethylene,
d) polymerizing in said second reactor (R2) and in the presence of said polymer fraction (RACO-1) propylene and comonomer to obtain polymer fraction (RACO-2) in an intimate mixture with (RACO-1) and hence the final propylene random copolymer, whereby preferably the polymerization takes place in the presence of a metallocene catalyst system in any one of the embodiments as described herein.

The propylene random copolymer is, therefore, preferably prepared by polymerizing propylene and comonomer, preferably ethylene, by a sequential polymerization process comprising, or consisting of, at least two reactors connected in series in the presence of a metallocene catalyst.

Each of the two polymerization stages can be carried out in solution, slurry, fluidized bed, bulk or gas phase.

The term "polymerization reactor" shall indicate that the main polymerization takes place therein. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene random copolymer is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the process for producing the propylene random copolymer (RACO) as defined above the conditions for the first reactor (R1), i.e. the slurry reactor (SR), like a loop reactor (LR), of step (a) may be as follows:

- the temperature is within the range of 40° C. to 110° C., preferably between 60° C. and 100° C., more preferably between 65 and 95° C.,
- the pressure is within the range of 20 bar to 80 bar, preferably between 40 bar to 70 bar,
- hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:

- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The polypropylene composition of the invention may comprise one or more usual additives, preferably in a total amount of from 0.01 up to 5.0 wt. %, more preferably from 0.05 to 3.0 wt. %, selected from the group comprising slip agents, anti-block agents, UV stabilizers, antistatic agents, alpha-nucleating agents and antioxidants.

Slip agents migrate to the surface and act as lubricants polymer to polymer and polymer against metal rollers, giving reduced coefficient of friction (CoF) as a result. Examples are fatty acid amids, like erucamide (CAS No. 112-84-5), oleamide (CAS No. 301-02-0), stearamide (CAS No. 124-26-5) or combinations thereof.

Examples of antioxidant are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Examples for acid scavengers are calcium stearates, sodium stearates, zinc stearates, magnesium and zinc oxides, synthetic hydrotalcite (e.g. SHT, CAS No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS No. 60676-86-0 (SuperFloss E™) or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate (Kaolin) CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0)

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81).

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component.

Preferably at least an antioxidant is added to the composition of the invention.

Unless explicitly described otherwise, the description of the present invention is to be understood so that one or more of any of the above described preferred embodiments of the composition of the invention can be combined with the invention described in its most general features.

The present invention further relates to a coated article having a coating layer which comprises, or consists of, the polypropylene composition in any of the above described embodiments and to a process for coating of an article in which the polypropylene composition in any of the above described embodiments is coated onto an article by extrusion.

The extrusion coating process may be carried out using conventional extrusion coating techniques. Hence, the composition according to the present invention may be fed, typically in the form of pellets, to an extruding device. From the extruder the polymer melt is passed preferably through a flat die to the substrate to be coated. The coated substrate is cooled on a chill roll, after which it is passed to edge trimmers and wound up.

The die width typically depends on the size of the extruder used. Thus with 90 mm extruders the width may suitably be within the range of 600 to 1,200 mm, with 115 mm extruders from 900 to 2,500 mm, with 150 mm extruders from 1,000 to 4,000 mm and with 200 mm extruders from 3,000 to 5,000 mm. The line speed (draw-down speed) is preferably 75 m/min or more, more preferably at least 100 m/min. In most commercially operating machines the line speed is preferably more than 300 m/min or more than 500 m/min. Modern machines are designed to operate at lines speeds of up to 1,000 m/min, for instance 300 to 800 m/min.

The temperature of the polymer melt is typically between 240 and 330° C. The polypropylene composition of the invention can be extruded onto the substrate as a monolayer coating or as an outer layer in a co-extrusion process. In a multilayer extrusion coating, a polymer layer structure as defined above and optionally the other polymeric layers may be co-extruded. It is possible to further perform ozone and/or corona treatment in a known way, if desired or necessary.

The main end-uses for extrusion coated products and articles obtained by using the composition according to the invention are in packaging applications, like liquid packaging for milk, juice, wine or other liquids, flexible packaging for snacks, confectionary, meat, cheese and medical products, rigid packaging like detergent cartons, cup and plate boards for oven or microwave use or in sterilizable food packaging, but also for photographic paper or industrial applications like paper reel and ream wraps, and technical laminates, preferably with sterilizable and/or retortable properties.

Still further, the invention relates to the use of the polypropylene composition in any of the above described embodiments for extrusion coating of an article.

The article can be any article on which a coating can be applied by extrusion coating, like fibrous substrates, such as paper, paperboard or Kraft paper or woven or non-woven fabrics, a metal foil, such as aluminium foil, or a plastic film, such as an oriented polypropylene film, non-oriented polypropylene film, PET film, PA film or cellophane film, a metallized film or combinations thereof.

Preferably, the article is paper, paperboard, a fibrous substrate, and/or a metal foil.

In the following, the measurement and determination methods for the parameters as used herein are given and the present invention is further illustrated by way of example and comparative example by reference to the figures, which show:

FIG. 1: Sealing curve of Inventive Example 1 (IE1)

Figure 2:
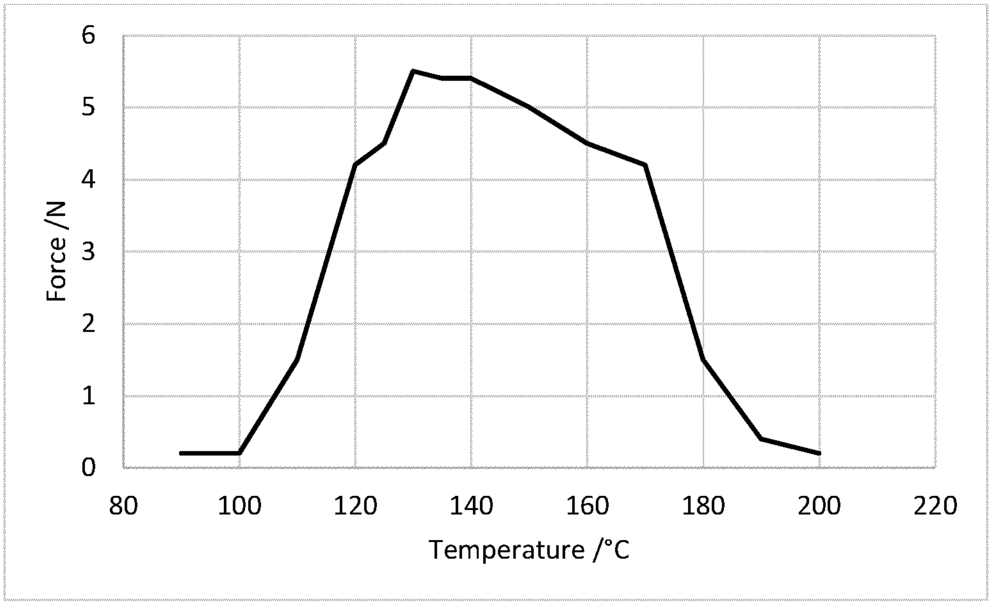

FIG. 2: Sealing curve of Comparative Example 2 (CE2).
Measurement and Determination Methods
a) Calculation of Comonomer Content of the Second Polymer Fraction (RACO-2):

$$\frac{C(A) - w(A1) \times C(A1)}{w(A2)} = C(A2) \qquad (I)$$

wherein w(A-1) is the weight fraction [in wt. %] of the first polymer fraction (RACO-1), w(A-2) is the weight fraction [in wt. %] of second polymer fraction (RACO-2), C(A-1) is the comonomer content [in wt. %] of the first polymer fraction (RACO-1), C(A) is the comonomer content [in wt. %] of the $C_2C_3$ random copolymer (RACO), C(A-2) is the calculated comonomer content [wt. %] of the second polymer fraction (RACO-2).

b) Measurement of Melt Flow Rate $MFR_2$
$MFR_2$ (230° C.) is measured according to ISO 1133 (230° C., 2.16 kg load).

c) Calculation of Melt Flow Rate $MFR_2$ of the Polymer Fraction (RACO-2):

$$MFR(A2) = 10\left[\frac{\log(MFR(A)) - w(A1) \times \log(MFR(A1))}{w(A2)}\right] \qquad (II)$$

wherein w(A1) is the weight fraction [in wt %] of the polymer fraction RACO-1 w(A2) is the weight fraction [in wt %] of the polymer fraction RACO-2,

MFR(A1) is the melt flow rate $MFR_2$ (230° C.) [g/10 min] of the polymer fraction RACO-1, MFR(A) is the melt flow rate $MFR_2$ (230° C.) [g/10 min] of the entire random propylene copolymer (RACO), MFR(A2) is the calculated melt flow rate $MFR_2$ (230° C.) [g/10 min] of the polymer fraction RACO-2.

d) Quantification of Microstructure by NMR Spectroscopy
Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimized 10 mm extended temperature probe head at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

e) Xylene Solubles (XCS, Wt. %):

The xylene soluble (XS) fraction as defined and described in the present invention was determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XS %=(100*m*V0)/(m0*v);
m0=initial polymer amount (g);
m=weight of residue (g);
V0=initial volume (ml);
v=volume of analysed sample (ml).

f) DSC Analysis, Melting (Tm) and Crystallization Temperature (Tc):

Data were measured with a TA Instrument Q2000 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C.

Crystallization temperature ($T_c$) and crystallization enthalpy ($H_c$) are determined from the cooling step, while melting temperature ($T_m$) and melting enthalpy ($H_m$) are determined from the second heating step.

g) Flexural Modulus

Flexural modulus is determined according to ISO 178 on 80×10×4 mm$^3$ test bars injection moulded in line with EN ISO 1873-2.

h) Hexane Extractables

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 20° C. The extraction was performed at a temperature of 50° C. and an extraction time of 30 min.

i) Molecular Weight Properties

Number average molecular weight (Mn), weight average molecular weight (Mw) and polydispersity (Mw/Mn) were determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

h) Sealing Behavior

The sealing behavior of the coatings was determined by measuring the hot tack force as follows:

The maximum hot-tack force, i.e. the maximum of a force/temperature diagram was determined and reported. Hot tack measurements were made with J&B hot tack tester following the method ASTM F 1921. The standard requires that the samples have to be cut into 15 mm slices in width. The samples are placed into the hot tack testing machine in vertical direction both ends attached to a mechanical lock. Then the tester seals and pulls out the hot seal and the resisting force is measured.

The sealing parameters were:

| | | |
|---|---|---|
| Seal Pressure: | 1.5 | N/mm$^2$ |
| Seal Time: | 0.5 | sec |
| Cool time: | 0.20 | sec |
| Peel Speed: | 200 | mm/sec |
| Width: | 15.0 | mm |

EXAMPLES

A propylene random copolymer in accordance with the invention (Inventive Example 1, IE1), using a single-site metallocene catalyst was prepared as follows:

Catalyst System IE1

Metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

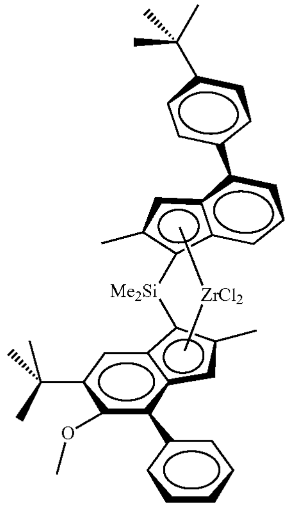

was synthesized according to the procedure as described in WO 2013/007650, E2.

A MAO-silica support was prepared as follows: A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32 kg) was added. The mixture was stirred for 15 min. Next 30 wt. % solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.6% Al by weight.

The final catalyst system was prepared as follows: 30 wt. % MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under $N_2$ flow at 60° C. for 2 h and additionally for 5 h under vacuum (−0.5 barg) under stirring. Dried catalyst was sampled in the form of pink free flowing powder containing 13.9 wt % Al and 0.26 wt % Zr.

The polymerization for preparing the inventive random copolymer of IE1 was performed in a Borstar pilot plant with a 2-reactor set-up (loop-gas phase reactor (GPR 1)) and a pre-polymerizer, using the catalyst system as described above.

In Table 1, the polymerization conditions for IE1 and the final properties of the resins of IE1 and CE2 are given.

TABLE 1

| Polymerization data (IE1) | | | |
|---|---|---|---|
| | | IE1 | CE2 |
| Prepolymerizer | | | |
| Temperature | ° C. | 25 | |
| Pressure | kPa | 5154 | |
| Loop | | | |
| Temperature | ° C. | 70 | |
| Pressure | kPa | 5405 | |
| Feed H2/C3 | mol/kmol | 0.4 | |
| Feed C2/C3 | mol/kmol | 42.07 | |
| Split | wt % | 56 | |
| C2 | wt % | 2.9 | |
| MFR | g/10 min | 11 | |
| GPR1 | | | |
| Temperature | ° C. | 80 | |
| H2/C3 | mol/kmol | 8.4 | |
| C2/C3 | mol/kmol | 177 | |
| Split | wt % | 44 | |
| C2 (total resin) | wt % | 3.8 | |
| MFR2 (total resin | g/10 min | 25 | |
| Final polymers | | | |
| MFR | g/10 min | 25 | 33 |
| C2 | wt % | 3.8 | 3.6 |
| XCS | wt % | 2.7 | 8.1 |
| Tm | ° C. | 128 | 149 |
| Tc | ° C. | 91 | 120 |
| 2, 1e | mol % | 0.4 | 0 |
| 2, 1t | Mol % | 0 | 0 |
| 3, 1e | Mol % | 0 | 0 |
| FM | MPa | 778 | 991 |
| MWD | n.a. | 3.4 | 6.5 |
| C6 FDA | wt. % | 1.1 | 3.5 |

The resin of CE2 corresponds to the ethylene propylene random copolymer as prepared with a Ziegler-Natta catalyst in IE3 of EP 2 999 721 B1, to which it is referred.

The polymer powders were compounded in a co-rotating twin-screw extruder Coperion ZSK 57 at 220° C. 0.1 wt % antioxidant (Irgafos 168FF); 0.1 wt % of a sterically hindered phenol (Irganox 1010FF); 0.05 wt % of Ca-stearat).

Using the compounded resins of IE1 and CE2 as described above, coating layer on paper was prepared by extrusion coating of the resins as follows:

Extrusion coating runs were made on Beloit co-extrusion coating line. It had Peter Cloeren's EBR die and a five layer feed block. The die width is 1000 mm and optimal working width is 600-800 mm. Designed top speed of the line is 1000 m/min, during production of test samples line speed was maintained at 150 m/min.

In the coating line above a UG kraft paper 70 g/$m^2$ was coated with a co-extruded structure, which was composed of the resin of IE1 or CE2 (Layer 1, 9 g/$m^2$), as disclosed above, and a Layer 2 (9 g/$m^2$) of polypropylene resin WG341C (commercially available from Borealis, density: 910 kg/$m^3$, melt Flow Rate (230° C./2.16 kg): 25 g/10 min, melting temperature (DSC) 161° C., Vicat softening temperature A, (10 N) 132° C.) attached to the paper substrate.

The temperature of the polymer melt was set to 290° C. and the extruders' temperature profile was 200-240-290-290° C. The chill roll was matt and temperature of its surface was 15° C. Used die opening was 0.65 mm and nip distance was 180 mm. Melt film touched the substrate for the first time+10 mm from nip to substrate side. Pressure of the pressure roll was 3.0 kp/cm<2>. The line speed was 150 m/min.

Hot tack of each sample was established by testing hot tack forces with temperatures ranging from 90° C. to temperature where the measured hot tack force was below 1 N. The standard requires at least 3 parallel measurements to be done. The temperature was increased in steps of 10 or 5° C.

The results of the hot tack force measurements of the coatings of IE1 and CE 2 are given in FIGS. 1 and 2, respectively.

SIT and SET values are obtained from hot tack measurement. In the present invention the lowest sealing temperature (SIT) is defined to be the temperature (° C.), where hot-tack strength is reaching 2 N, and highest sealing temperature (SET) is the temperature (° C.), where hot-tack strength is still at 2 N.

Maximum hot-tack strength is defined to be the highest strength (N) level over 20° C. interval of sealing range.

As can be seen from the data in FIGS. 1 and 2, the coating prepared in IE1 provides lower sealing temperature and higher sealing force.

Moreover, as can be seen from the data in Table 1, the resin of IE1 has a much lower amount of hexane extractables according to the FDA test (1.1 wt. % vs. 3.5 wt. % for CE2), and is thus very well suited for any kind of food applications.

The invention claimed is:

1. A polypropylene composition comprising a propylene random copolymer having
- a melt flow rate $MFR_2$ (230° C./2.16 kg) measured according to ISO 1133 of 17 to 40 g/10 min,
- a melting temperature $T_m$ as determined by DSC according to ISO 11357 of 115 to 145° C.,
- a number of 2,1 and 3,1 regio defects of from 0.01 to 1.2 mol % as measured by $^{13}C$ NMR, and
- a xylene cold soluble (XCS) fraction as determined according to ISO 16152 of from 0.1 to below 15 wt. %.

2. The polypropylene composition according to claim 1 wherein the propylene random copolymer has been produced in the presence of a single-site catalyst.

3. The polypropylene composition according to claim 1 wherein the propylene random copolymer has a molecular weight distribution MWD as determined by GPC of 2.4 to 5.5 and/or has a hexane extractables contents as measured according to the FDA test of less than 2.0 wt. %.

4. The polypropylene composition according to claim 1 wherein the propylene random copolymer has a molecular weight distribution MWD as determined by GPC of 2.5 to 4.5 and/or has a hexane extractables contents as measured according to the FDA test of less than 1.5 wt. %.

5. The polypropylene composition according to claim 1 wherein the propylene random copolymer is having a melt flow rate $MFR_2$ (230° C./2.16 kg) measured according to ISO 1133 of 17 to 35 g/10 min, and/or a melting temperature $T_m$ as determined by DSC according to ISO 11357 of 120 to 140° C., and/or a number of 2,1 and 3,1 regio defects of from 0.1 to 1.0 mol % as measured by $^{13}C$ NMR.

6. The polypropylene composition according to claim 1 wherein the propylene random copolymer is an ethylene propylene random copolymer.

7. The polypropylene composition according to claim 1 wherein the propylene random copolymer has an ethylene content in the range of from 2.0 to 5.5 wt. %, or in the range of 2.2 to 4.5 wt. %.

8. The polypropylene composition according to claim 1 wherein the propylene random copolymer has a crystallization temperature $T_c$ as determined by DSC according to ISO 11357 in the range of 75 to 110° C.

9. The polypropylene composition according to claim 1 wherein the propylene random copolymer has a crystallization temperature $T_c$ as determined by DSC according to ISO 11357 in the range of 80 to 105° C. and/or has a xylene cold soluble (XCS) fraction as determined according to ISO 16152 of from 0.1 to below 7.5 wt. %.

10. The polypropylene composition according to claim 1 wherein the propylene random copolymer has a flexural modulus as determined according to ISO 178 on injection moulded specimens of 500 to 1000 MPa.

11. The polypropylene composition according to claim 1 wherein the random propylene copolymer comprises, or consists of, two polymer fractions (RACO-1) and (RACO-2) and the split between fractions (RACO-1) and (RACO-2) is from 30:70 to 70:30.

12. A coated article having a coating layer which comprises the polypropylene composition according to claim 1.

13. A process for coating of an article in which a polypropylene composition according to claim 1 is coated onto an article by extrusion.

14. The process or use according to claim 13 wherein the article is paper, paperboard, a fibrous substrate, and/or a metal foil.

15. A polypropylene composition comprising a propylene random copolymer having
- a melt flow rate $MFR_2$ (230° C./2.16 kg) measured according to ISO 1133 of 17 to 40 g/10 min,
- a melting temperature $T_m$ as determined by DSC according to ISO 11357 of 17 to 145° C., and
- a number of 2,1 and 3, 1 regio defects of from 0.01 to 1.2 mol % as measured by $^{13}C$ NMR, and
- a hexane extractables contents as measured according to the FDA test of less than 2.0 wt. %.

16. The polypropylene composition according to claim 15, wherein the propylene random copolymer has an ethylene content in the range of from 2.0 to 5.5 wt. %, or in the range of 2.2 to 4.5 wt. %.

17. The polypropylene composition according to claim 15, wherein the propylene random copolymer has a crystallization temperature $T_c$ as determined by DSC according to ISO 11357 in the range of 75 to 110° C.

18. The polypropylene composition according to claim 15, wherein the propylene random copolymer has a xylene cold soluble (XCS) fraction as determined according to ISO 16152 of from 0.1 to below 15 wt. %.

19. A coated article having a coating layer which comprises the polypropylene composition according to claim 16.

* * * * *